UNITED STATES PATENT OFFICE.

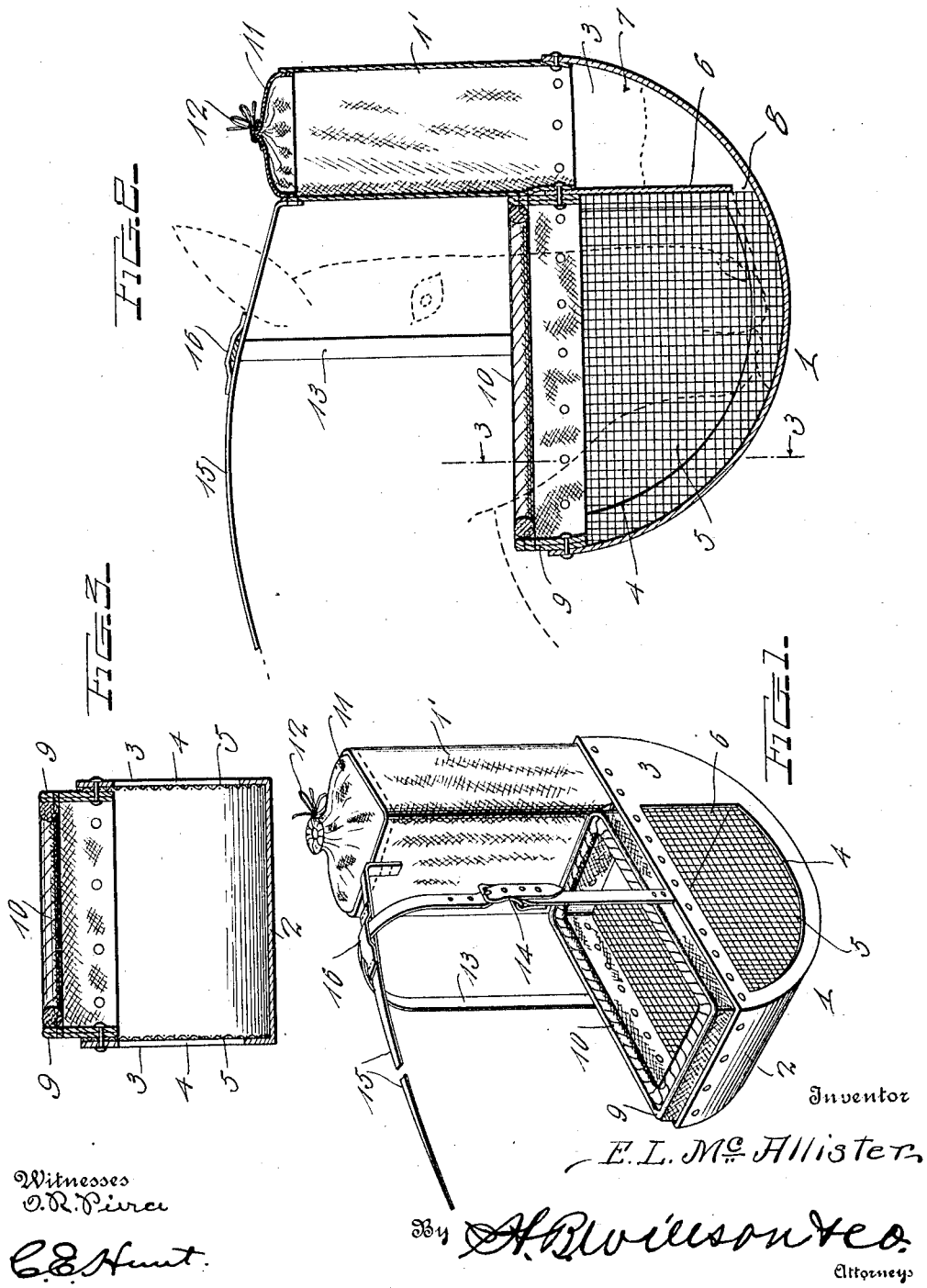

ELBERT L. McALLISTER, OF NORTHBRIDGE, MASSACHUSETTS.

FEED-BAG.

1,054,226.  Specification of Letters Patent.  Patented Feb. 25, 1913.

Application filed September 3, 1912. Serial No. 718,345.

*To all whom it may concern:*

Be it known that I, ELBERT L. MCALLISTER, a citizen of the United States, residing at Northbridge, in the county of Worcester and State of Massachusetts, have invented certain new and useful Improvements in Feed-Bags; and I do declare the following to be a full, clear, and exact description of the invention, such as will enable others skilled in the art to which it appertains to make and use the same.

This invention relates to improvements in feed bags.

One object of the invention is to provide a feed bag having a hopper or food holding compartment and a feeding compartment into which the feed passes from the hopper only as fast as it can be eaten by the animal thus preventing the feed from clogging the ventilated sides of the feed compartment and providing plenty of breathing space for the animal.

Another object is to provide a feed bag of this character which may be readily attached to and comfortably supported by the head of the animal and from which the feed will not be spilled and wasted.

With these and other objects in view, the invention consists of certain novel features of construction, combination and arrangement of parts as will be more fully described and claimed.

In the accompanying drawings, Figure 1 is a perspective view of my improved feed bag; Fig. 2 is a central vertical section thereof showing the same applied to a horse's head the latter being shown in dotted lines; Fig. 3 is a vertical cross sectional view taken on the line 3—3 of Fig. 2.

My improved feed bag comprises a feeding compartment or member 1 and a hopper or food holding member 1'. The feeding compartment or member 1 is of substantially semi-circular shape and of suitable width and said compartment or member comprises bottom and side members 2 and 3 which are preferably formed of sheet metal but which may be constructed of any suitable material. In the inner portion of the sides 3 are ventilating openings 4 which are covered by fine mesh wire netting screens 5 which are secured to the inner surfaces of the sides in any suitable manner. In the outer portion of the member or compartment 1 is arranged a transverse vertically disposed partition 6 which extends from the top of the compartment to a point near the bottom thereof and forms in the outer portion of the compartment 1 a feed chute 7 which communicates with the main portion of the compartment 1 through the discharge opening 8 formed below the partition 6 as clearly shown in Fig. 2 of the drawings.

Riveted or otherwise secured to the inner surfaces of the upper edges of the sides and partition 6 of the compartment 1 is a guard strip 9 which projects a suitable distance above the upper edges of the compartment or member 1. The strip 9 may be formed of any suitable material but is preferably constructed of canvas or heavy fabric and has secured to the inner side thereof and around its upper edge a guard flange 10 which is preferably formed from a piece of rope of suitable size and length which is sewed or otherwise fastened to the inner side of the guard strip 9 as shown. The guard strip 9 and the rope flange 10 protect the nose and face of the animal from injury by the upper edges of the metal sides of the compartment 1 and said rope flange also forms a stop which prevents the grain from being thrown out of the compartment while the animal is feeding.

The hopper or feed holding member 1' is preferably constructed of stiff canvas or similar material made in the form of a bag corresponding in size to the upper end of the feed chute 7 in the feeding compartment or member 1'. The lower end of the hopper or bag 2 is open and said open lower end is secured in the upper end of the chute 7 by rivets or other suitable fastening devices as shown. The upper end of the bag or hopper 1' is also open and has secured therein a closing member 11 formed of thin soft fabric in the upper edge of which is a casing containing a draw string 12 whereby the upper edges of said closing member may be drawn together and fastened to close the upper end of the hopper as clearly shown in Figs. 1 and 2 of the drawings. By thus closing the upper end of the hopper the food contained therein is prevented from being thrown out and wasted.

The device is provided with an attaching and supporting strap 13 formed in sections which have their inner ends suitably secured to the strip 9 or other suitable part of the feeding compartment or member 1 of the bag. To the outer end of one of the sections of the strap 13 is secured a buckle 14 with which the outer end of the other section of the strap is adapted to be connected whereby the length of the strap may be adjusted to support the bag at the proper position on the head of the animal. In applying the bag to the head of the animal the strap 13 is passed over the top of the head immediately back of the ears as clearly shown in Fig. 2 of the drawings and in order to hold the bag in proper position and to support the hopper 1' an additional strap 15 is preferably provided, said strap having its outer end secured to the inner side of the upper end of the hopper 1' and extends back over the head of the animal between the ears and has its inner end secured to a suitable part of the harness not shown. The strap 15 preferably passes beneath the strap 13 and to said strap 15 is secured a guide loop 16 through which the strap 13 passes and is held in position.

By constructing and arranging my improved feed bag as herein shown and described it will be seen that the feed from the hopper 1' will pass into the feed chute 7 and from the same through the feed opening 8 below the partition 6 in limited quantities and only as fast as the feed can be eaten from the feeding compartment.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined and claimed.

Having thus described my invention, what I claim is:

In a feed bag of the character described, the combination of a semi-cylindrical feeding receptacle having in the sides thereof screened ventilating openings, a rectangular shaped flexible guard strip secured to the upper edges of the central and rear portions of said feeding receptacle and projected vertically above said edges, an inwardly extending guard flange secured to the inner face of the upper edge of said guard strip, an upright partition transversely arranged in the feeding receptacle near its front portion and having its lower end spaced from the bottom of the receptacle, said partition forming at the front end of the receptacle a feed chute and a feed passage connecting said chute with the main portion of the receptacle, a flexible food holding bag arranged perpendicularly over said feed chute and having its lower end secured in the latter, a flexible closing member secured to the upper end of said bag, an adjustable head strap secured to the sides of the receptacle, and a bag supporting strap having its front end secured to the bag and its intermediate portion provided with a guide to receive the head strap.

In testimony whereof I have hereunto set my hand in presence of two subscribing witnesses.

ELBERT L. McALLISTER.

Witnesses:
   SADIE L. QUACKENBUSH,
   THOMAS J. MURPHY.

---

Copies of this patent may be obtained for five cents each, by addressing the "Commissioner of Patents, Washington, D. C."